United States Patent
Shikama et al.

(10) Patent No.: US 10,987,920 B2
(45) Date of Patent: Apr. 27, 2021

(54) PRINTING APPARATUS, PRINTING SYSTEM, AND PRINTING METHOD

(71) Applicants: Takeshi Shikama, Kanagawa (JP); Hiroki Tanaka, Kanagawa (JP); Ryosuke Takeuchi, Kanagawa (JP)

(72) Inventors: Takeshi Shikama, Kanagawa (JP); Hiroki Tanaka, Kanagawa (JP); Ryosuke Takeuchi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/802,582

(22) Filed: Feb. 27, 2020

(65) Prior Publication Data

US 2020/0282720 A1     Sep. 10, 2020

(30) Foreign Application Priority Data

Mar. 4, 2019   (JP) .............................. JP2019-038602

(51) Int. Cl.
| | | |
|---|---|---|
| G06F 15/00 | (2006.01) | |
| G06F 3/12 | (2006.01) | |
| G06K 1/00 | (2006.01) | |
| B41J 2/045 | (2006.01) | |
| B41J 3/36 | (2006.01) | |
| G06K 15/10 | (2006.01) | |
| G06K 15/02 | (2006.01) | |

(52) U.S. Cl.
CPC ....... *B41J 2/04536* (2013.01); *B41J 2/04586* (2013.01); *B41J 3/36* (2013.01); *G06K 15/102* (2013.01); *G06K 15/1848* (2013.01)

(58) Field of Classification Search
CPC ...... B41J 2/04536; B41J 2/04586; B41J 3/36; G06K 15/102; G06K 15/1848
USPC .............................. 358/1.15, 1.1, 1.14, 1.13
See application file for complete search history.

(56) References Cited

U.S. PATENT DOCUMENTS

| | | | |
|---|---|---|---|
| 4,807,177 A | 2/1989 | Ward | |
| 9,047,551 B2* | 6/2015 | Ishii | ................... G06K 15/1806 |
| 10,308,014 B2* | 6/2019 | Watanabe | .................. B41J 3/46 |
| 2012/0061909 A1 | 3/2012 | Shikama et al. | |
| 2012/0229866 A1 | 9/2012 | Miyazaki et al. | |
| 2012/0262750 A1 | 10/2012 | Kinoshita et al. | |
| 2013/0063536 A1 | 3/2013 | Komai et al. | |

(Continued)

FOREIGN PATENT DOCUMENTS

AP        2016-215472       12/2016

OTHER PUBLICATIONS

Extended European Search report dated May 27, 2020, issued in corresponding European Patent Application No. 20160401.4, 6 pages.

(Continued)

*Primary Examiner* — Douglas Q Tran
(74) *Attorney, Agent, or Firm* — Xsensus LLP

(57) ABSTRACT

A handheld printing apparatus includes a memory and processing circuitry. The memory is configured to store a plurality of pieces of image data. The processing circuitry is configured to print the plurality of pieces of image data one by one in an order. The processing circuitry is configured to print one piece of image data by one scan and switch a piece of image data to be printed, in the order among the plurality of pieces of image data, each time one scan ends.

20 Claims, 17 Drawing Sheets

(56) References Cited

U.S. PATENT DOCUMENTS

| | | |
|---|---|---|
| 2013/0084109 A1 | 4/2013 | Shikama et al. |
| 2014/0139607 A1 | 5/2014 | Hayashi et al. |
| 2016/0339720 A1 | 11/2016 | Tanaka |
| 2018/0170080 A1 | 6/2018 | Suzuki |
| 2018/0178557 A1* | 6/2018 | Nakazawa ............. B41J 11/008 |
| 2019/0238690 A1* | 8/2019 | Arakawa ............ H04N 1/00228 |
| 2019/0250866 A1* | 8/2019 | Arakawa ................ G06F 3/1203 |
| 2019/0283408 A1 | 9/2019 | Tanaka et al. |

OTHER PUBLICATIONS

U.S. Appl. No. 16/508,949, filed Jul. 11, 2019 Takeshi Shikama, et al.

* cited by examiner

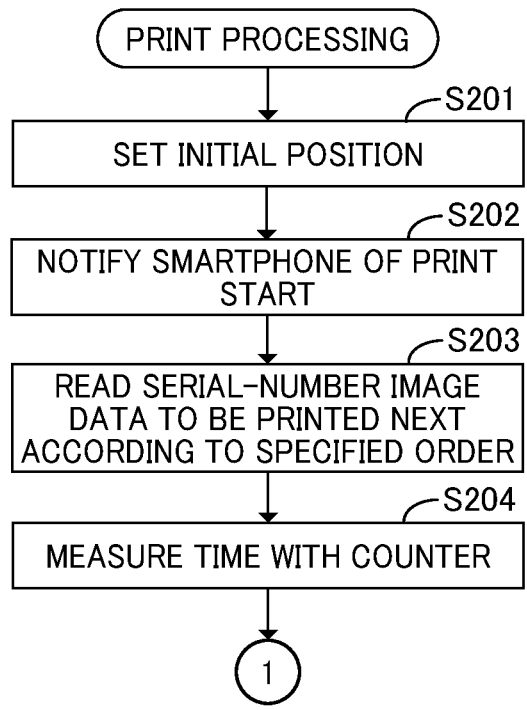

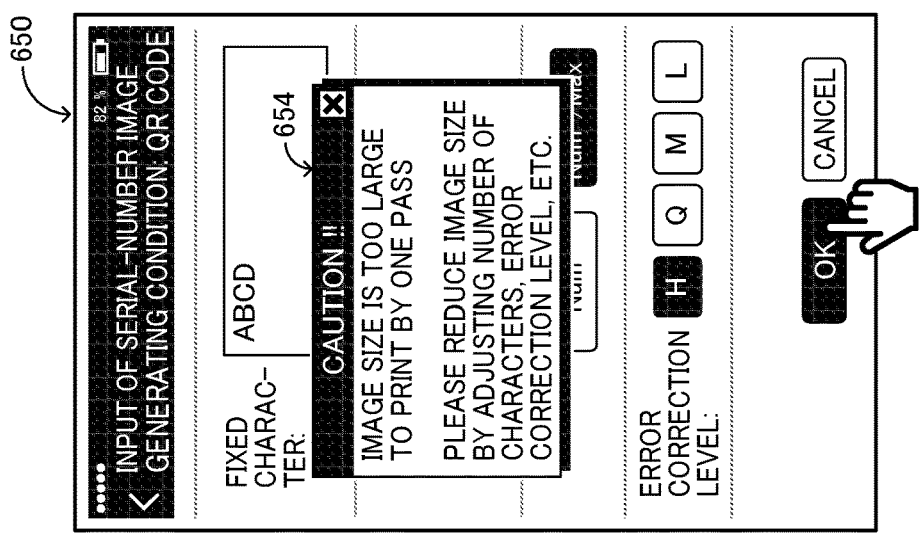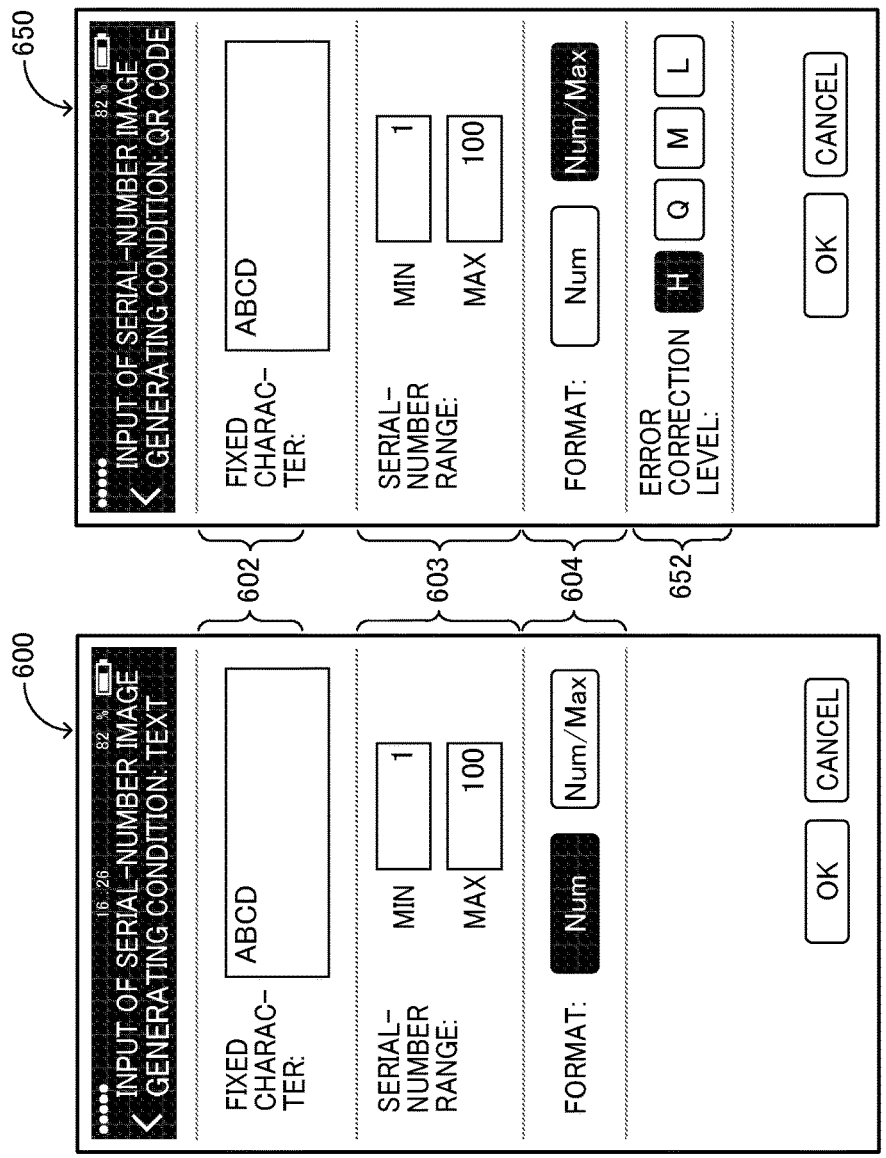

PRINTING APPARATUS, PRINTING SYSTEM, AND PRINTING METHOD

CROSS-REFERENCE TO RELATED APPLICATION

This patent application is based on and claims priority pursuant to 35 U.S.C. § 119(a) to Japanese Patent Application No. 2019-038602, filed on Mar. 4, 2019, in the Japan Patent Office, the entire disclosure of which is hereby incorporated by reference herein.

BACKGROUND

Technical Field

Aspects of the present disclosure relate to a printing apparatus, a printing system, and a printing method.

Related Art

As laptop computers (e.g., personal computers) become compact and smart devices (e.g., smartphones) spread rapidly, compact mobile printers are strongly desired.

To meet such a demand, recently there have been proposed mobile printers in which a recording medium conveyance system is omitted so that ink is applied while a user moves the mobile printer freely (or the mobile printer moves in a self-propelled manner) over a plane such as a paper surface to scan the surface (freehand scanning).

As an application of such a handheld printer, for example, an application is considered in which serial numbers are printed on a plurality of print media. However, such a conventional handheld printer has no mechanism suitable for printing a plurality of images continuously.

SUMMARY

In an aspect of the present disclosure, there is provided a handheld printing apparatus that includes a memory and processing circuitry. The memory is configured to store a plurality of pieces of image data. The processing circuitry is configured to print the plurality of pieces of image data one by one in an order. The processing circuitry is configured to print one piece of image data by one scan and switch a piece of image data to be printed, in the order among the plurality of pieces of image data, each time one scan ends.

In another aspect of the present disclosure, there is provided a handheld printing apparatus that includes a memory and processing circuitry. The memory is configured to store a plurality of pieces of image data. The processing circuitry is configured to print the plurality of pieces of image data one by one in an order. The processing circuitry is configured to print one piece of image data by n times scans, where n is an integer of two or more, and switch a piece of image data to be printed, in the order among the plurality of pieces of image data, each time the n times scans end.

In still another aspect of the present disclosure, there is provided a printing system that includes the handheld printing apparatus and an image data providing device. The image data providing device is configured to provide the plurality of pieces of image data to the handheld printing apparatus. The image data providing device includes processing circuitry configured to automatically generate the plurality of pieces of image data representing serial-number information, the serial-number information including serial numbers; and transmit the plurality of pieces of image data generated by the serial-number image data generating unit to the handheld printing apparatus.

In still another aspect of the present disclosure, there is provided a method of printing a plurality of pieces of image data using a handheld printing apparatus. The method includes automatically generating the plurality of pieces of image data; storing the plurality of pieces of image data generated by the generating; and printing the plurality of pieces of image data one by one in an order. The printing includes printing one piece of image data by one scan; and switching a piece of image data to be printed in the order among the plurality of pieces of image data each time one scan ends.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 8 including FIGS. 8A and 8B is a flowchart of print processing executed by the handheld printer according to the first embodiment;

FIGS. 10A, 10B, and 10C are diagrams of a serial-number image generating condition input screen of the image data providing device according to the first embodiment;

FIGS. 11A, 11B, and 11C are diagrams illustrating examples of print preview screens of the image data providing device according to the first embodiment;

DETAILED DESCRIPTION

Figure 1:
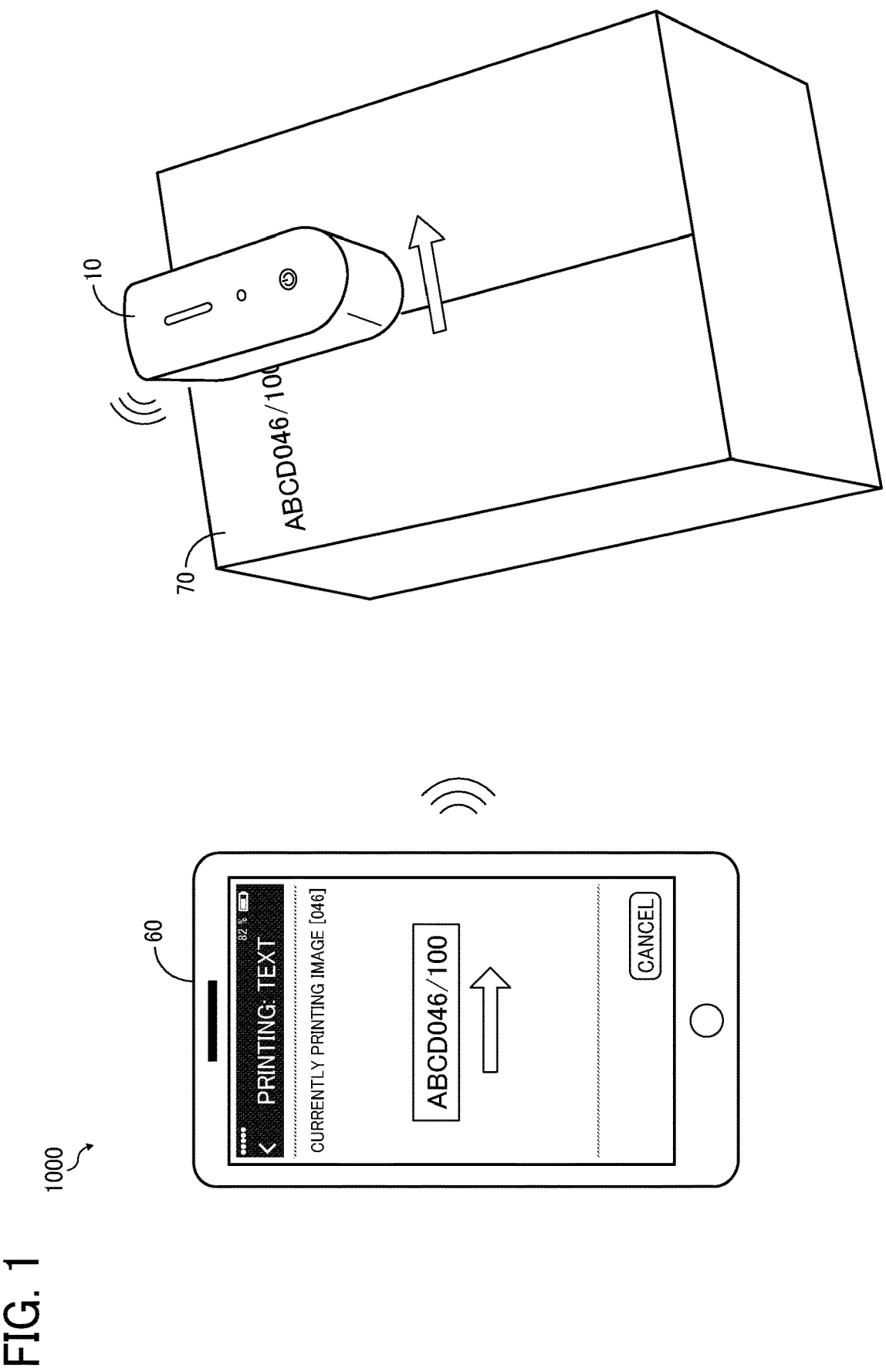
FIG. 1 is a schematic view illustrating a printing system according to a first embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Although embodiments of the disclosure are described below, embodiments of the present invention are not limited to the embodiments described below. In the drawings referred below, the same reference codes are used for the common elements, and the description thereof is omitted as appropriate.

First Embodiment

FIG. 1 is a schematic view illustrating a printing system 1000 according to a first embodiment of the present disclosure. As illustrated in FIG. 1, the printing system 1000 includes a handheld printer 10 and an image data providing device 60.

The handheld printer 10 is a handheld printing apparatus and employs an inkjet method as a printing method. The user can hold the handheld printer 10 and freely move the handheld printer 10 over a recording medium 70 (a print medium) to form a desired image on the recording medium 70. The printing method of the handheld printer 10 is not limited to the inkjet method, and other printing methods, such as a dot impact method, can be employed in other embodiments.

The image data providing device 60 is an information processing apparatus that provides image data to be printed to the handheld printer 10. Thus, the information processing device originates a print request. Examples of the image data providing device 60 includes a smartphone, a tablet terminal, and a laptop computer. In the following description, the case where the image data providing device 60 is a smartphone is described as an example. Hereinafter, the image data providing device is referred to as a smartphone 60.

Each of the handheld printer 10 and the smartphone 60 has a wireless communication capability conforming to a predetermined wireless standard such as infrared communication, Bluetooth (registered trademark), Wi-Fi (registered trademark), etc., and exchange necessary information wirelessly. However, the present embodiment does not exclude configurations in which information is exchanged through wired communication.

The configuration of the printing system 1000 according to the present embodiment has been outlined above. Next, an external configuration of the handheld printer 10 according to the present embodiment is described.

Figure 2A:
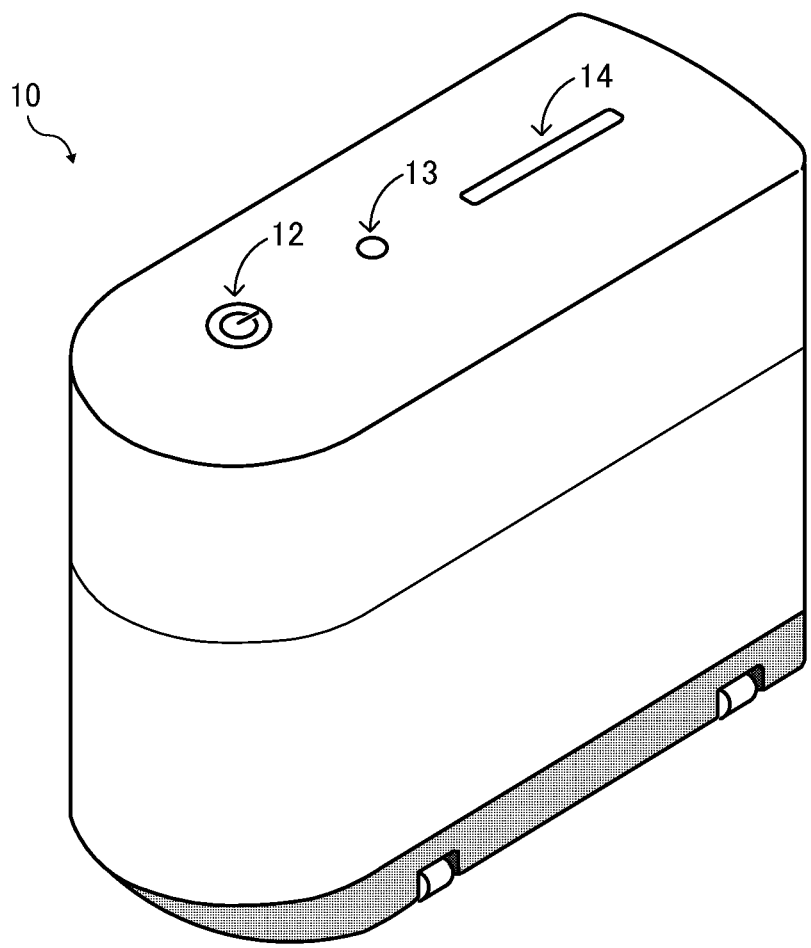
FIGS. 2A and 2B are external views of a handheld printer according to the first embodiment.
Figure 2B:
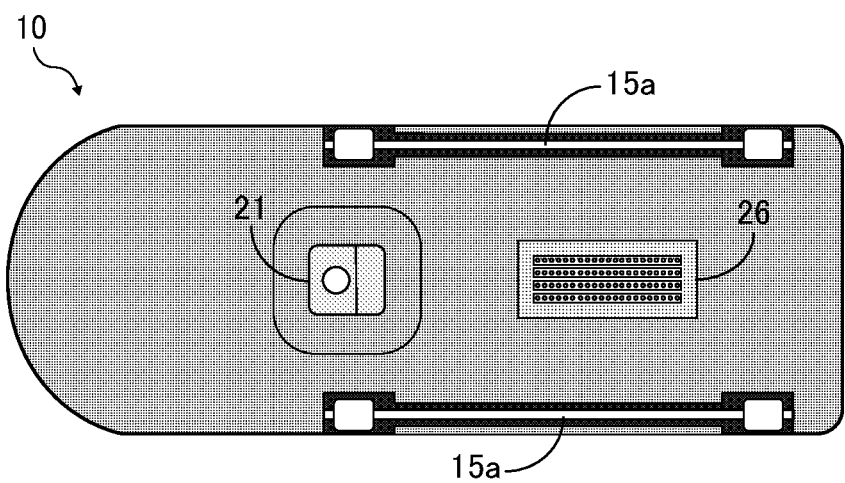

FIG. 2A is a perspective view of the handheld printer 10. FIG. 2B is a bottom view of the handheld printer 10. As illustrated in FIG. 2B, the handheld printer 10 has a substantially rectangular parallelepiped housing. On a top side of the housing, a power button 12, a light emitting diode (LED) lamp 13, and a print start button 14 are disposed. A bottom side of the housing is opposed to a recording medium 70 during printing. On the bottom side, guide rollers 15a and 15b, a navigation sensor 21, and a recording head unit 26 are disposed. A gyro sensor (to be described later) is mounted inside the housing.

The navigation sensor 21 has a mechanism similar to a mechanism of an optical mouse, to detect the amount of movement of the handheld printer 10. The navigation sensor 21 irradiates the recording medium 70 opposed thereto with light, photographs the reflected light, and calculates the amount of movement of the handheld printer 10 based on the difference in the acquired image data. More specifically, the movement amount of the handheld printer 10 mentioned here is a difference in position ($\Delta X$, $\Delta Y$) of the navigation sensor 21 within a two-dimensional orthogonal coordinate system. The X-axis and the Y-axis of the two-dimensional orthogonal coordinate system (hereinafter "printer coordinate system") correspond to the width direction and the longitudinal direction of the bottom side of the housing of the handheld printer 10, respectively.

The recording head unit 26 includes a recording head as a recording device. The recording head includes a plurality of nozzles (discharge ports), and ink droplets discharged from the nozzles form a print image on a recording medium opposed to the nozzles.

The guide rollers 15a and 15b enable smooth scanning of the recording medium. At the same time, the guide rollers 15a and 15b serve as spacers to secure a gap between the nozzles of the recording head and the recording medium 70 necessary for printing.

The external configuration of the handheld printer 10 according to the present embodiment has been described above. Subsequently, a hardware configuration of the handheld printer 10 is described based on FIG. 3.

Figure 3:
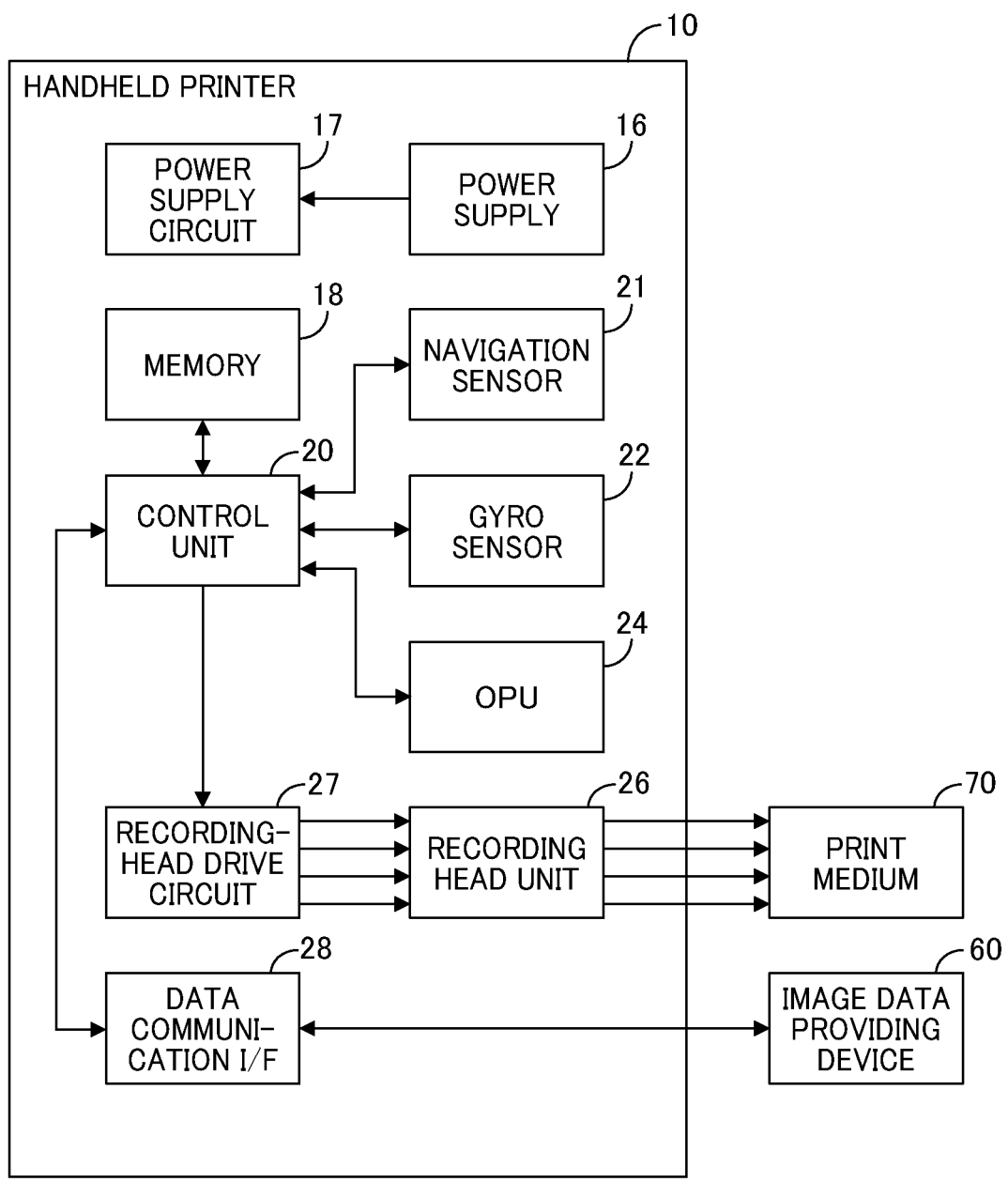
FIG. 3 is a block diagram illustrating a hardware configuration of the handheld printer according to the first embodiment.

As illustrated in FIG. 3, in addition to the navigation sensor 21 and the recording head unit 26 described above, the handheld printer 10 includes a power supply 16, a power supply circuit 17, a memory 18, a control unit 20, a gyro sensor 22, an operation panel unit (OPU) 24 (an operation device), a recording-head drive circuit 27, and an image data communication interface (I/F) 28, which are mounted inside the housing.

The power supply 16 supplies power used by the handheld printer 10 and is, for example, a secondary battery. The power supply circuit 17 controls power supply to each unit of the handheld printer 10.

The memory 18 is a storage device constructed of a read only memory (ROM) or a dynamic random access memory (DRAM). The ROM stores one or more programs for controlling the hardware of the handheld printer 10, drive waveform data for driving the recording head, data of initial setting information, and the like. The DRAM provides a program execution space and temporarily stores various data such as image data and the drive waveform data.

The control unit 20 controls overall operation of the handheld printer 10, a detailed description of which is described later.

The gyro sensor 22 detects the rotation angle of the handheld printer 10 and detects a change in rotation angle from a previous access. Here, the rotation angle of the handheld printer 10 represents a rotation angle (AO) about an axis orthogonal to the printer coordinate system (plane coordinate system).

The OPU 24 accepts an operation of the user and notifies the user of the state of the handheld printer 10. In the present embodiment, the power button 12, the print start button 14, and the LED lamp 13 correspond to the OPU 24.

The recording-head drive circuit 27 controls the recording head of the recording head unit 26.

The data communication I/F 28 is a data communication I/F based on a predetermined wireless standard, and the handheld printer 10 transmits and receives data to and from the smartphone 60 via the data communication I/F 28.

Figure 4:
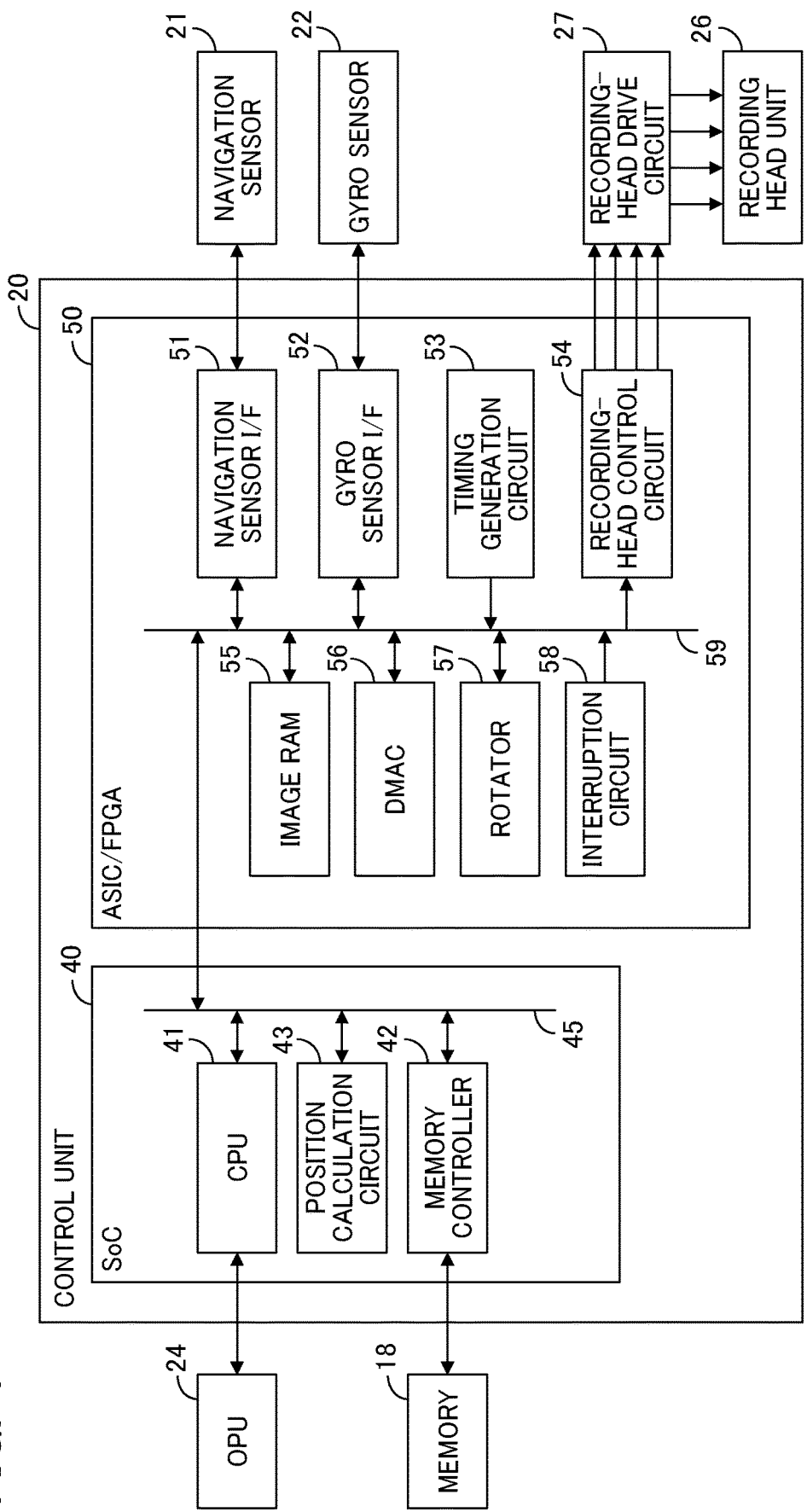
FIG. 4 is a block diagram illustrating a hardware configuration of a controller of the handheld printer according to the first embodiment.

The hardware configuration of the handheld printer 10 according to the present embodiment has been described above. Subsequently, a hardware configuration of the control unit 20 of the handheld printer 10 is described with reference to FIG. 4.

The control unit 20 includes a system on chip (SoC) 40 and an application-specific integrated circuit (ASIC)/field-programmable gate array (FPGA) 50. The SoC 40 includes a central processing unit (CPU) 41, a memory controller 42, and a position calculation circuit 43, which perform data communication via a bus 45.

The CPU 41 controls overall operation of the handheld printer 10. The memory controller 42 controls the memory 18.

The position calculation circuit 43 calculates the position coordinates of the navigation sensor 21, using the movement amount ($\Delta X$, $\Delta Y$) detected by the navigation sensor 21 and the rotation angle ($\Delta \theta$) of the handheld printer 10 detected by the gyro sensor 22. Further, the position calculation circuit 43 calculates the position coordinates of each nozzle of the recording head, based on the calculated position coordinates of the navigation sensor 21.

The ASIC/FPGA 50 includes a navigation sensor I/F 51, a gyro sensor I/F 52, a timing generation circuit 53, a recording-head control circuit 54, an image random access memory (RAM) 55, a direct memory access controller (DMAC) 56, a rotator 57, and an interruption circuit 58, which perform data communication via a bus 59. The bus 59 is connected to the bus 45 so that the SoC 40 and the ASIC/FPGA 50 can perform data communication with each other.

The timing generation circuit 53 generates the timing at which the navigation sensor I/F 51 reads the output value ($\Delta X$, $\Delta Y$) from the navigation sensor 21, the timing at which the gyro sensor I/F 52 reads the output value ($\Delta \theta$) from the gyro sensor 22, and the timing at which the recording head discharges a liquid droplet. Further, the timing generation circuit 53 transmits these timings to the navigation sensor I/F 51, the gyro sensor I/F 52, and the recording-head control circuit 54.

The navigation sensor I/F 51 performs data communication with the navigation sensor 21.

The gyro sensor I/F 52 performs data communication with the gyro sensor 22.

The DMAC 56 reads out, from the memory 18 via the memory controller 42, data of an image to be formed by liquid discharged from the nozzles based on the coordinates of the nozzle calculated by the position calculation circuit 43 and stores the image data in the image RAM 55.

The image RAM 55 is a memory to temporarily store the image data read by the DMAC 56.

The rotator 57 rotates image data to be printed according to the position and the inclination of the recording head of the handheld printer 10. The rotator 57 acquires image data from the image RAM 55 and rotates the image data in accordance with the position and inclination of the recording head of the handheld printer 10. Then, the rotator 57 transmits the image data to the recording-head control circuit 54 when the image data satisfies a predetermined condition required for ink discharge (hereinafter, "discharge condition").

The recording-head control circuit 54 controls the recording-head drive circuit 27 to control the discharge operation of the recording head. The recording-head control circuit 54 transmits, to the recording-head drive circuit 27, a control signal for controlling the discharge operation of the recording head and image data to be printed at a timing specified by the timing generation circuit 53.

The interruption circuit 58 transmits an interrupt signal to the SoC 40. The interruption circuit 58 transmits, to the SoC 40, an interrupt signal indicating that the navigation sensor I/F 51 ends communication with the navigation sensor 21, and an interrupt signal for notification of status information such as an error.

Figure 5:
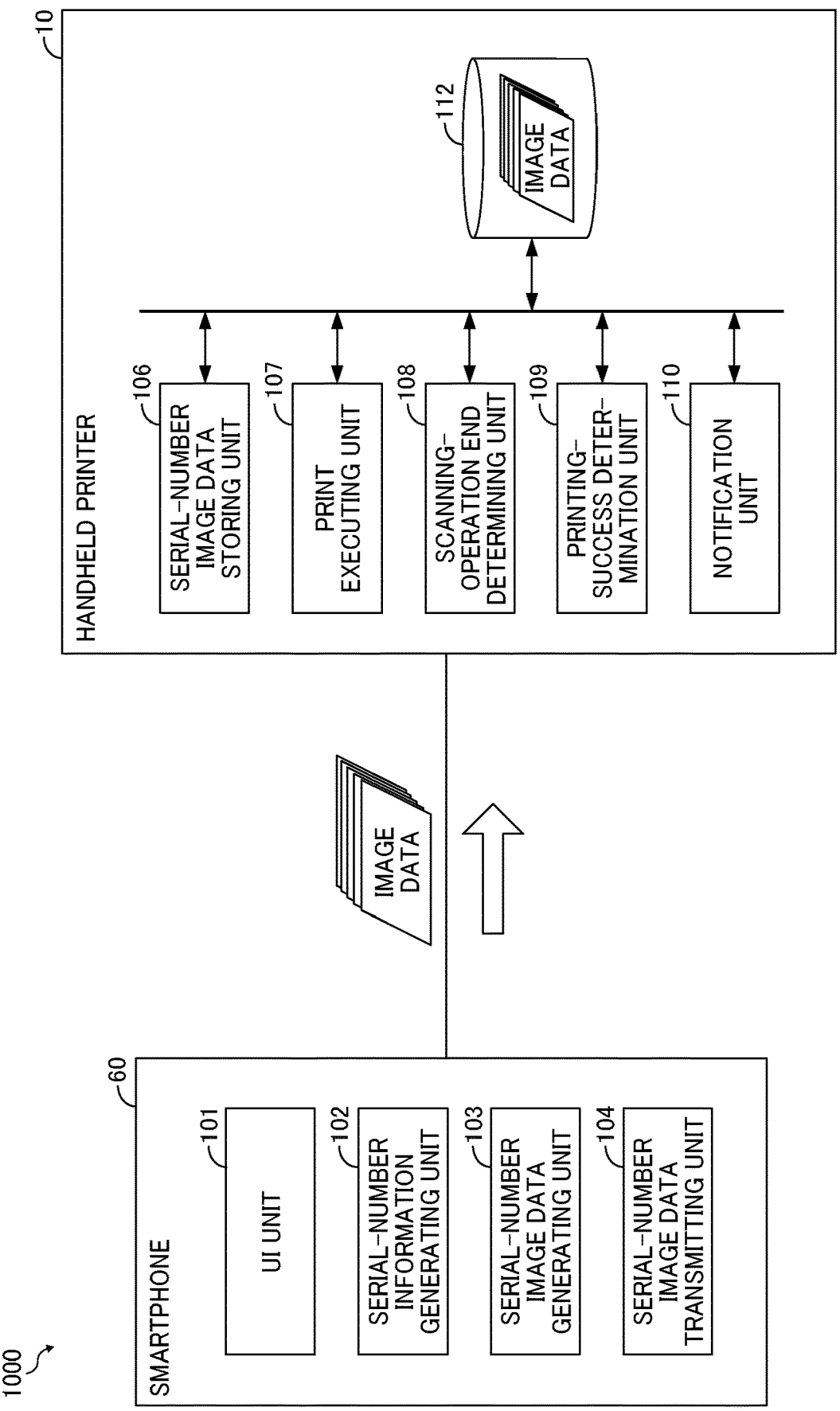
FIG. 5 is a functional block diagram of the printing system according to the first embodiment.

The hardware configuration of the control unit 20 of the handheld printer 10 has been described above. Next, the functional configurations of the smartphone 60 and the handheld printer 10 are described based on the functional block diagram illustrated in FIG. 5.

The smartphone 60 includes a user interface (UI) unit 101, a serial-number information generating unit 102, a serial-number image data generating unit 103, and a serial-number image data transmitting unit 104. In the present embodiment, a dedicated application program (hereinafter, referred to as a dedicated application) is installed in a computer mounted on the smartphone 60, and the computer executes the dedicated application to function as units described below.

The UI unit 101 displays various UI screens on the display of the smartphone 60.

The serial-number information generating unit 102 generates serial-number information (described later) including a serial number in response to a user input via the UI screen.

The serial-number image data generating unit 103 generates serial-number image data representing serial-number information.

The serial-number image data transmitting unit 104 transmits the serial-number image data to the handheld printer 10.

The handheld printer 10 includes a serial-number image data storing unit 106, a print executing unit 107, a scanning-operation end determining unit 108, a printing-success determination unit 109, a notification unit 110, and a storage area 112 as a storage unit. In the present embodiment, the control unit 20 (CPU 41) of the handheld printer 10 execute programs to function as units described later.

The serial-number image data storing unit 106 stores the serial-number image data received from the smartphone 60 in the storage area 112.

The print executing unit 107 executes printing of serial-number image data.

The scanning-operation end determining unit 108 determines the end of the scanning operation by the user.

The printing-success determination unit 109 determines the success or failure of printing of each serial-number image data to be printed.

The notification unit 110 performs various notifications to the smartphone 60.

The functional configurations of the smartphone 60 and the handheld printer 10 have been described above. Next, the contents of processes executed by the printing system 1000 of the present embodiment are described.

Here, before starting the description of the processes, the meanings of the terms used below are described.

In the present embodiment, the term "serial number" signifies a series of numerical values that increase or decrease according to a predetermined rule. In the present embodiment, a decimal number that is incremented by one is treated as "serial number." In other embodiments, decimal numbers that increase by an increment of N (N is a natural number of two or more) may be referred to as "serial number." Alternatively, a numerical value in another notation system such as a binary number or a hexadecimal number may be treated as "serial number."

In the present embodiment, the term "fixed character" signifies an arbitrary character or character string to be added to "serial number" and includes one or more elements selected from alphabets, hiragana, katakana, kanji, numbers, and various symbols.

In the present embodiment, the term "serial-number information" signifies text information including at least "serial number." Note that the term "serial-number information" of the present embodiment include a combination of "fixed character" and "serial number" but does not necessarily include "fixed character." The term "serial-number information" may include information other than "fixed character."

In the present embodiment, the term "serial-number image data" signifies image data representing "serial-number information." The image data representing "serial-number information" here is, specifically, a text image representing "serial-number information" or a code pattern generated by encoding "serial-number information." In the present embodiment, the format of the code pattern is not limited to any particular format and may be a one-dimensional code represented by a bar code or a two-dimensional code as represented by a quick response (QR) code (hereinafter referred to as QR Code which is a registered trademark).

Figure 6A:
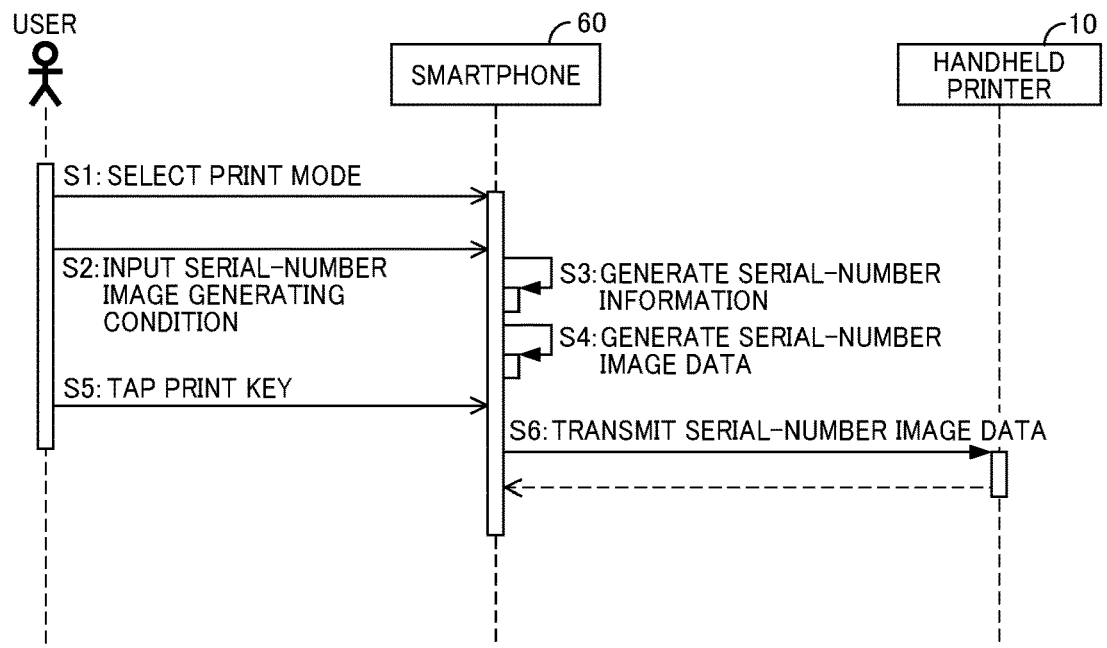
FIGS. 6A and 6B are sequence diagrams of processes executed by the printing system according to the first embodiment.

Now that the meanings of the terms have been described, a series of processing performed until the preparation for printing the serial-number image data is completed is described with reference to the sequence diagram illustrated in FIG. 6A. In the following, a case is described as an example where a QR Code is employed as a code pattern format for encoding "serial-number information."

Figure 9:
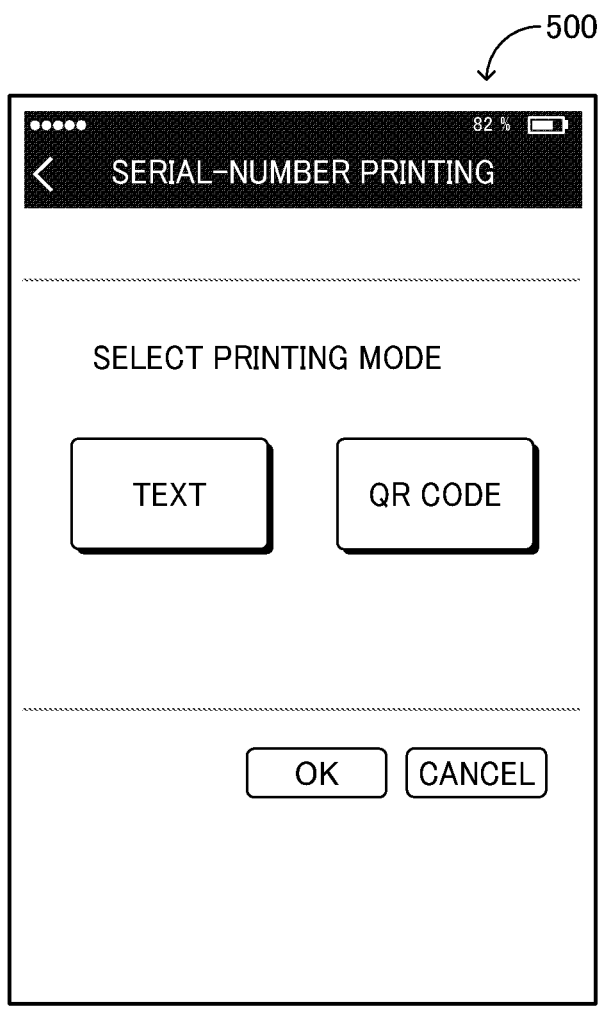
FIG. 9 is a diagram illustrating a print mode selection screen of an image data providing device according to the first embodiment.

When the user operates the smartphone 60 to start the dedicated application, the UI unit 101 displays a print mode selection screen. FIG. 9 illustrates a print mode selection screen 500 displayed by the UI unit 101. In the present embodiment, two modes, "text mode" and "QR Code mode," are prepared as serial-number printing modes. Two buttons "print" and "text" are displayed on the print mode selection screen 500 in correspondence with the respective modes.

When the user taps any button of "text" or "QR Code" to select the print mode (step S1) in response to the display of the print mode selection screen 500, the UI unit 101 displays a serial-number image generating condition input screen for inputting a condition for generating serial-number image data. In response to the display, the user inputs the serial-number image generating condition through the displayed serial-number image generating condition input screen in the following procedure (step S2).

When the user selects "text" as the print mode, a serial-number image generating condition input screen 600 illustrated in FIG. 10A is displayed. As illustrated in FIG. 10A, a field 602 for inputting fixed characters, a field 603 for setting a range of serial numbers, and a field 604 for selecting a format for the serial numbers are displayed on the serial-number image generating condition input screen 600.

In the present embodiment, when the user taps the field 602, a software keyboard is raised on the screen. The user specifies the font, size, style, and the like via the software keyboard and input an arbitrary fixed character in the field 602.

When the user taps the field 603, a software keyboard is similarly raised on the screen. The user inputs the minimum value of the serial numbers and the maximum value of the serial numbers to the field 603 via the software keyboard.

Further, the user taps and selects one of the two buttons "Num" and "Num/Max" displayed in the field 604. If the user selects "Num," a format representing only numerical values of the serial numbers is set as the serial number format. Alternatively, when the user selects "Num/Max," a format representing a fraction having the numerical value of each of the serial numbers as the numerator and the maximum value of the serial numbers as the denominator is set as the serial number format. The "Num/Max" format is suitable, for example, when it is desired to express the number of pieces of luggage (corresponding to the maximum value of the serial numbers).

On the other hand, when the user selects "QR Code" as the print mode, a serial-number image generating condition input screen 650 illustrated in FIG. 10B is displayed. As illustrated in FIG. 10B, a field 602 for inputting fixed characters, a field 603 for setting a range of serial numbers, and a field 604 for selecting the format of the serial numbers are displayed on the serial-number image generating condition input screen 650, similarly to the serial-number image generating condition input screen 600. Similarly to the procedure described above, the user inputs an arbitrary fixed character in the field 602, sets the minimum number and the maximum number of serial numbers in the field 603, and taps one of the two buttons "Num" and "Num/Max" displayed in the field 604 to select the format of the serial numbers.

In addition, since a field 652 for selecting an error correction level of the QR Code is displayed on the serial-number image generating condition input screen 650, the user taps any one of four buttons "H," "Q," "M," and "L" displayed on the field 652 to select the error correction level.

After the user finishes inputting the serial-number image generating condition in the above-described procedure, in response to the user's tapping of the "OK" button on the serial-number image generating condition input screen 600 or 650, the serial-number information generating unit 102 generates serial number information based on the input serial-number image generating condition (step S3).

For example, when the input illustrated in FIG. 10A is performed by the user, the serial-number information generating unit 102 generates one hundred serial numbers that increase by an increment of one in the range from the minimum value "1" to the maximum value "100" input in the field 603, and joins the fixed character "ABCD" input to the field 602 to the head of each serial number. As a result, one hundred character strings in which serial numbers (1 to 100) are connected to the rear end of the fixed character "ABCD" are generated as serial-number information.

On the other hand, when the input illustrated in FIG. 10B is performed by the user, the serial-number information generating unit 102 generates one hundred serial numbers that increase by an increment of one in the range from the minimum value "1" to the maximum value "100" input to the field 603 and converts each serial number to a fraction having the numerical value of each serial number as the numerator and "100" as the denominator. Then, the fixed character "ABCD" input in the field 602 is joined to the head of each fraction. As a result, one hundred character strings are generated as serial-number information. In each of the one hundred character strings, each of the serial numbers (from 1/100 to 100/100) of the fractional expression is joined to the rear end of the fixed character "ABCD."

Subsequently, the serial-number image data generating unit 103 generates serial-number image data based on the serial-number information generated in step S3 (step S4). For example, when "text" is selected as the print mode, the serial-number image data generating unit 103 generates, as the serial-number image data, a text image in which the serial-number information generated in step S3 is represented by a specified font, size, style, and the like. Alternatively, when "QR Code" is selected as the print mode, the serial-number image data generating unit 103 generates, as the serial-number image data, a QR Code in which the serial-number information generated in step S3 is encoded at the error correction level selected in the field 652 of the serial-number image generating condition input screen 650.

If the size of the serial-number image data generated in step S4 is greater than the size that can be printed by one scanning operation, the UI unit 101 notifies the user that the size of the serial-number image data is excessive. For example, when the number of characters of fixed characters is large or when the error correction level is set high, the size of the text image or the QR Code (the width of the text image or the QR Code in the direction orthogonal to the scanning direction) may be greater than the size of the recording head of the handheld printer 10 (the length of the recording head in the direction orthogonal to the scanning direction). In such a case, the UI unit 101 displays a dialog screen 654 illustrated in FIG. 10C, notifies the user that the image size is too large to be printed by one scanning operation, and prompts the user to correct the serial-number image data.

In response to the generation of the serial-number image data in step S4, the UI unit 101 displays a print preview screen. FIG. 11A illustrates an example of a print preview screen 700 displayed when "text" is selected as the print mode and "Num" is selected as the serial number format. FIG. 11B illustrates an example of the print preview screen 700 displayed when "text" is selected as the print mode and "Num/Max" is selected as the serial number format. As illustrated in FIGS. 11A and 11B, the print preview screen 700 displays a list of one hundred text images representing serial-number information so that the user can brows all of the text images by scrolling the screen.

On the other hand, FIG. 11C illustrates an example of a print preview screen 750 displayed when "QR Code" is selected as the print mode and "Num/Max" is selected as the serial number format. As illustrated in FIG. 11C, the print preview screen 750 displays a list of one hundred QR Codes obtained by encoding the serial-number information so that the user can browse all of the text images by scrolling the screen.

Thereafter, when the user taps the "print" button on the print preview screen 700 or 750 (step S5), the serial-number image data transmitting unit 104 in response to the tapping of the "print" button transmits the serial-number image data generated in step S4 to the handheld printer 10 (step S6).

Figure 7:
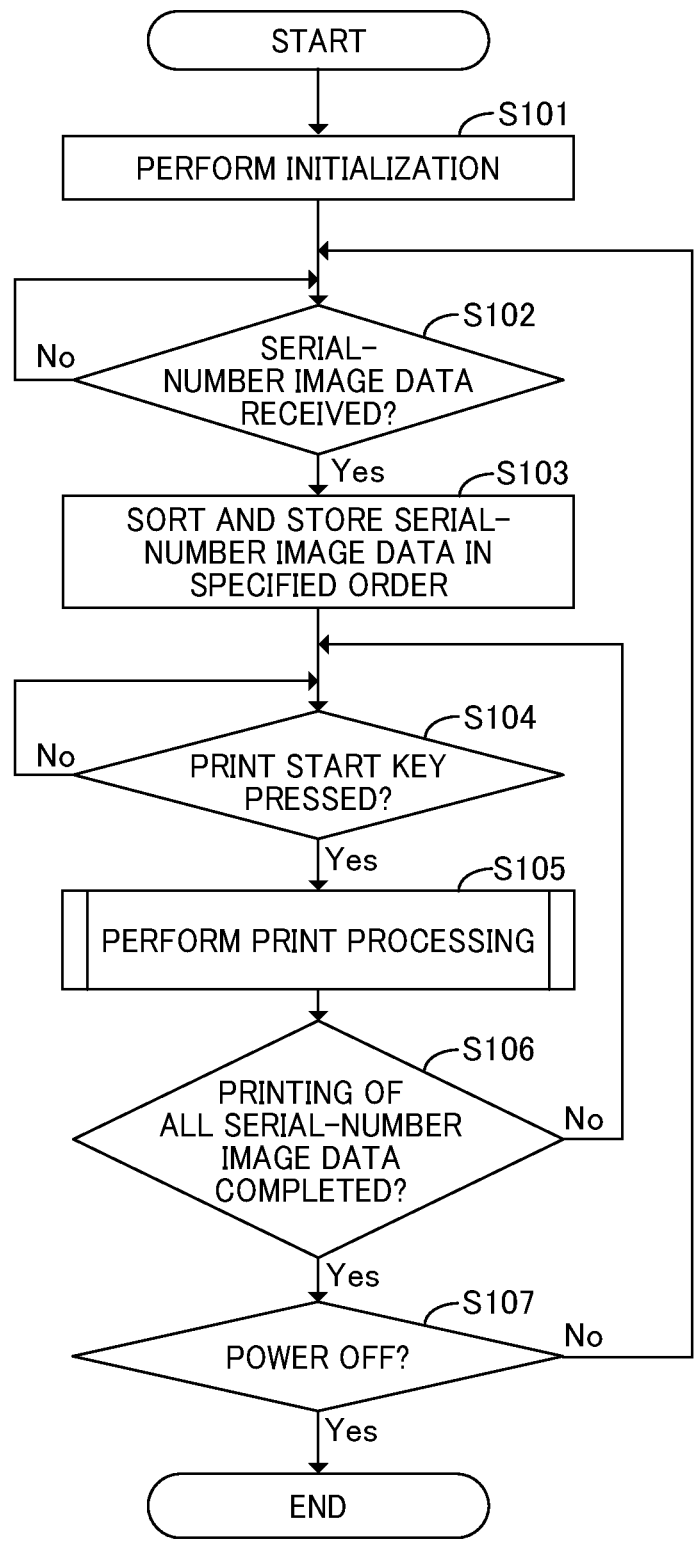
FIG. 7 is a flowchart of a process executed by the handheld printer according to the first embodiment.

The series of processing performed until the preparation for printing the serial-number image data is completed has been described above. Next, the contents of processing executed by the handheld printer 10 are described with reference to a flowchart illustrated in FIG. 7.

When the user presses the power button 12 of the handheld printer 10, the handheld printer 10 initializes each mounted device (step S101).

Then, the handheld printer 10 waits for the serial-number image data transmitted from the smartphone 60 (No in step S102). When receiving the serial-number image data (Yes in step S102), the serial-number image data storing unit 106 sorts the serial-number image data, which is received from the smartphone 60, in an order and stores the sorted serial-number image data in the storage area 112 (step S103). The serial-number image data may be sorted in an ascending order or in descending an order of serial numbers.

Then, the handheld printer 10 waits for the press of the print start button 14 (No in step S104). When the print start button 14 is pressed (Yes in step S104), the navigation sensor 21 and the gyro sensor 22 starts detection of the movement amount ($\Delta X$, $\Delta Y$) and the rotation angle ($\Delta \theta$), respectively, and the control unit 20 starts the print processing (step S105).

Figure 8B:
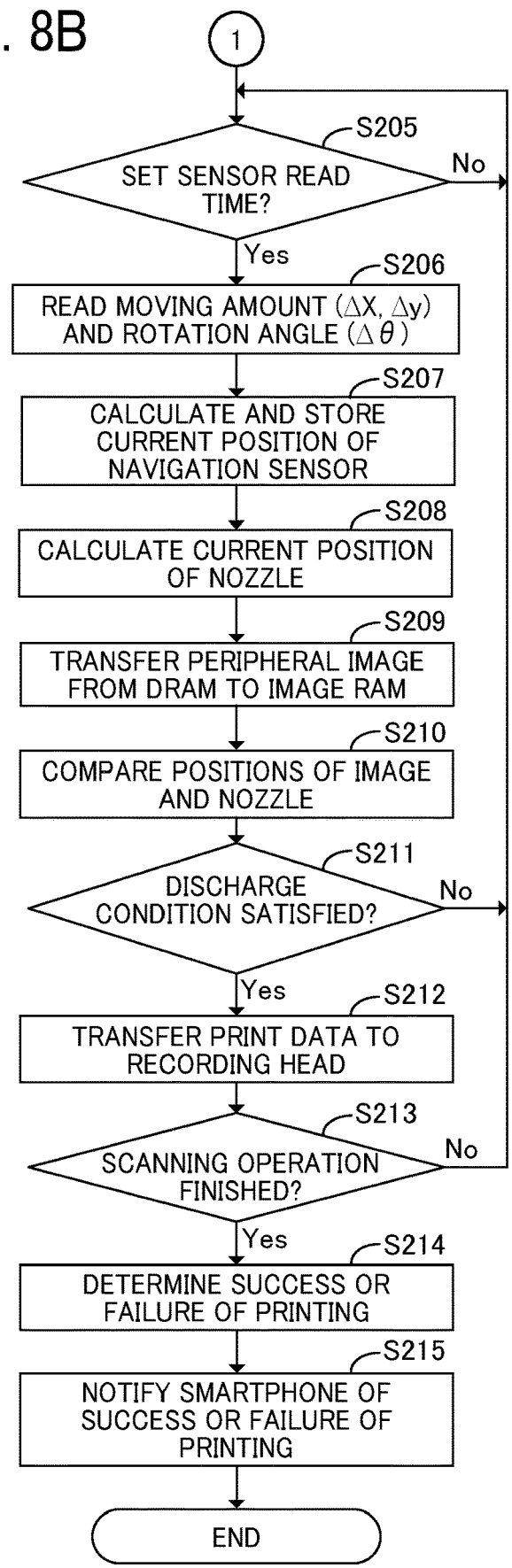

Hereinafter, the contents of the print processing executed in step S105 are described with reference to a flowchart illustrated in FIG. 8.

First, in step 201, the CPU 41 of the SoC 40 calculates an initial position of the navigation sensor 21 based on the position coordinates of the navigation sensor 21 at the time when the print start button 14 is pressed, and stores the initial position in the memory 18. The CPU 41 notifies the navigation sensor I/F 51 to obtain the movement amount ($\Delta X$, $\Delta Y$) from the navigation sensor 21 and notifies the gyro sensor I/F 52 to obtain the rotation angle ($\Delta \theta$) from the gyro sensor 22.

In the following step S202, the notification unit 110 notifies the smartphone 60 of the start of printing.

In the subsequent step S203, the print executing unit 107 selects one piece of serial-number image data to be printed next in an order (in this case, serial-number image data located at the top of the order) from a plurality of pieces of serial-number image data stored in the storage area 112.

In the following step S204, the timing generation circuit 53 of the ASIC/FPGA 50 measures time with a counter. The navigation sensor I/F 51 and the gyro sensor I/F 52 wait for the arrivals of read timings of the navigation sensor 21 and the gyro sensor 22, respectively (No in step S205). When the read timings arrive (Yes in S205), the navigation sensor I/F 51 and the gyro sensor I/F 52 respectively read the movement amount ($\Delta X$, $\Delta Y$) and the rotation angle ($\Delta \theta$) from the respective internal memories of the navigation sensor 21 and the gyro sensor 22 (step S206).

The CPU 41 of the SoC 40 reads the movement amount ($\Delta X$, $\Delta Y$) and the rotation angle ($\Delta \theta$) from the navigation sensor I/F 51 and the gyro sensor I/F 52 of the ASIC/FPGA 50, respectively. Further, the CPU 41 calculates the current coordinates of the navigation sensor 21 based on the most recent coordinates of navigation sensor 21 (e.g., Xs, Ys) stored in the memory 18 and the movement amount ($\Delta X$, $\Delta Y$) and the rotation angle ($\Delta \theta$) read in step S206. The CPU 41 stores the calculated current coordinates in the memory 18 (step S207).

The CPU 41 of the SoC 40 transmits the calculated current coordinates of the navigation sensor 21 to the ASIC/FPGA 50. In response, the rotator 57 of the ASIC/FPGA 50 calculates the position coordinates of each nozzle of the print head from the positional relationship between the navigation sensor 21 and the recording head unit 26 (step S208).

Based on the position information of each nozzle calculated in step S208, the DMAC 56 of the ASIC/FPGA 50 reads image data around each nozzle, which constitutes part of the serial-number image data read out in the previous step S203, from the memory 18 (DRAM) and transfers the image data to the image RAM 55 (step S209).

In response, the rotator 57 rotates the image data stored in the image RAM 55 in accordance with the position and the tilt of the recording head specified by the CPU 41 at the initialization. The rotator 57 compares the rotated image data and the coordinates of each nozzle (step S210) and determines whether the discharge condition is satisfied (step S211).

When the discharge condition is not satisfied (No in step S211), the process returns to step S205. When the discharge condition is satisfied (Yes in step S211), the rotator 57 transmits the image data to the recording-head control circuit 54 (step S212). In response, the recording-head control circuit 54 controls the recording-head drive circuit 27 to discharge ink from the nozzles of the recording head onto the recording medium.

In the following step S213, the scanning-operation end determining unit 108 determines whether the scanning operation of the user has ended by an appropriate method. In the present embodiment, the above-described determination can be performed by the following method using an operation that the user lifts the handheld printer 10 after the end of the scanning operation.

The first method determines the end of the scanning operation based on the change in the attitude of the handheld printer 10, focusing on the fact that the attitude of the handheld printer 10 changes when the user lifts the handheld printer 10. The change in the attitude of the handheld printer 10 can be determined based on the angular velocity detected by the gyro sensor 22. The second method determines the end of the scanning operation based on the separation distance between the bottom surface of the handheld printer 10 and the print medium, focusing on the fact that the bottom surface of the handheld printer 10 is separated from the print medium when the user lifts the handheld printer 10. Note that the above-described separation distance can be determined based on the intensity of the reflected light detected by the navigation sensor 21.

In step S213, the above-described steps S205 to S212 are repeated until the scanning-operation end determining unit 108 determines the end of the scanning operation (No in step S213). When the end of the scanning operation is determined (Yes in step S213), the process proceeds to step S214.

In the following step S214, the printing-success determination unit 109 determines the success or failure of printing of the one piece of serial-number image data read in the previous step S203. More specifically, when printing has been completed for all areas of the one piece of serial-number image data read out in step S203, the printing-success determination unit 109 determines that printing has been successful. When there remains an area on which printing has not been completed, the printing-success determination unit 109 determines that printing has failed. For example, if the timing of lifting the handheld printer 10 is too early, in step S214 the printing-success determination unit 109 determines that printing has failed.

In step S215, the notification unit 110 notifies the smartphone 60 of the determination result (printing success or printing failure) of the success or failure of printing performed in the previous step S214.

Returning to FIG. 7, a description is continued.

When the print processing in step S105 is completed, it is determined in the subsequent step S106 whether printing of all pieces of the serial-number image data stored in the storage area 112 has been completed. As a result, if non-printed serial-number image data remains (No in step S107), the process returns to step S104. Thereafter, the processing of steps S104 to S106 is repeated until printing of all pieces of serial-number image data stored in the storage area 112 is completed.

On the other hand, when printing of all pieces of serial-number image data stored in the storage area 112 is completed (Yes in step S106), it is determined in the following step S107 whether the power of the handheld printer 10 is off. As a result, when the power of the handheld printer 10 is on (No in step S107), the process returns to step S102. Thereafter, the processing of steps S102 to S107 is repeated until the power is turned off. When the power is turned off (Yes in step S107), all the process ends.

Figure 6B:
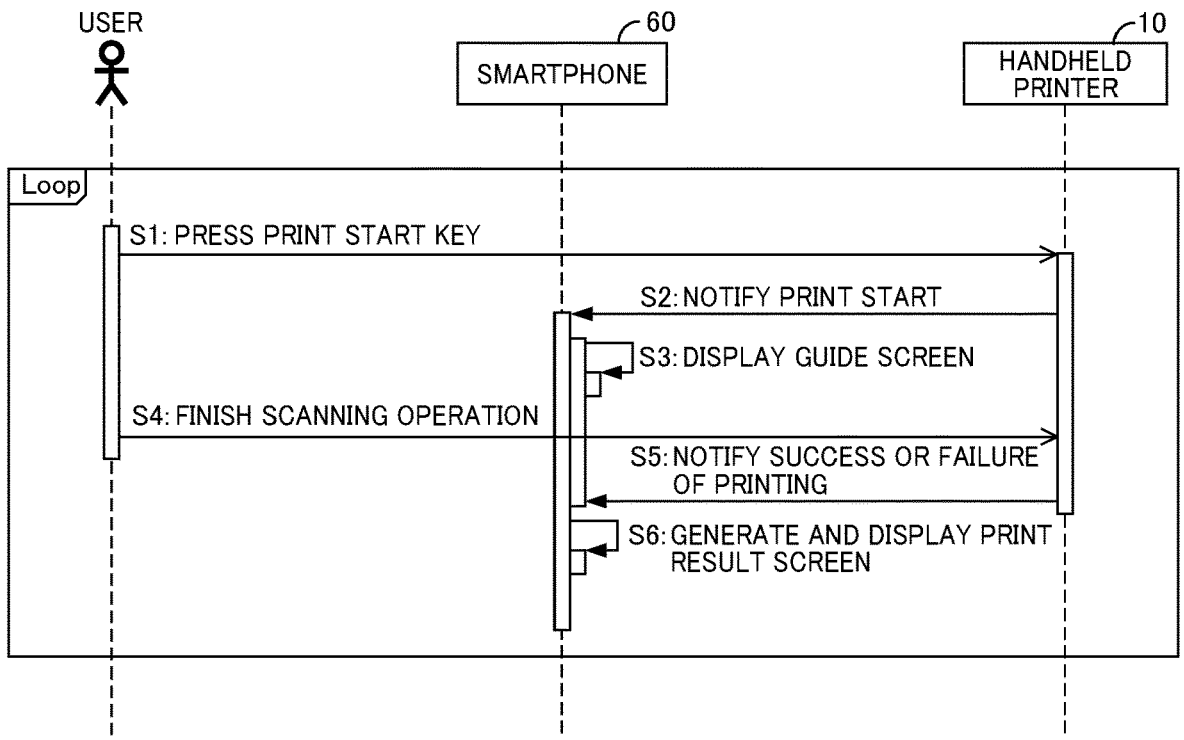

The processing executed by the handheld printer 10 has been described above. Next, the processing executed on the smartphone 60 side when the printing of the serial-number image data is executed is described with reference to a sequence diagram illustrated in FIG. 6B.

In the present embodiment, at the time of executing printing of serial-number image data, the following processing is repeatedly executed on the smartphone 60 side. That is, when the user presses the print start button 14 of the handheld printer 10 (step S1), the handheld printer 10 notifies the smartphone 60 of the start of printing (step S2). In response to the notification, the UI unit 101 of the smartphone 60 displays a guide screen illustrated in FIG. 12A or 12B (step S3).

Figure 12B:
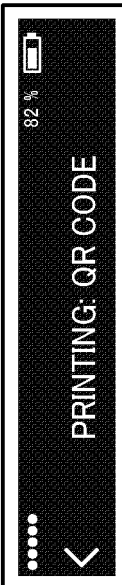
FIGS. 12A and 12B are diagrams illustrating examples of guide screens of the image data providing device according to the first embodiment.
Figure 12A:
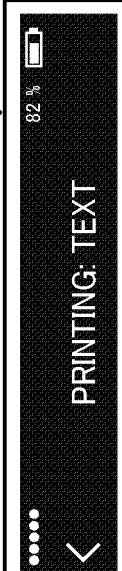

FIG. 12A illustrates a guide screen 800 when "text" is selected as the print mode. As illustrated in FIG. 12A, the guide screen 800 displays a preview of a text image currently being printed. On the other hand, FIG. 12B illustrates a guide screen 850 when "QR Code" is selected as the print mode. As illustrated in FIG. 12B, the guide screen 850 displays a preview of a QR Code currently being printed.

When the user ends the scanning operation of the handheld printer 10 (step S4), the handheld printer 10 notifies the smartphone 60 of the success or failure of the printing (step S5). In response to the notification, the smartphone 60 generates and displays a print result screen based on the notified print success or failure (step S6).

Figure 13B:
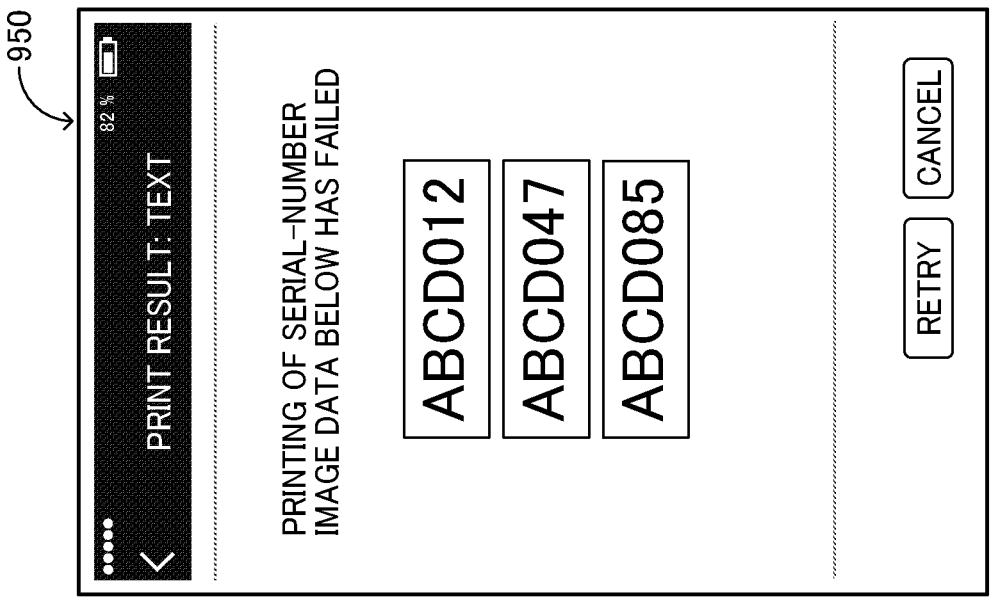
FIGS. 13A and 13B are diagrams illustrating examples of print result screens of the image data providing device according to the first embodiment.
Figure 13A:
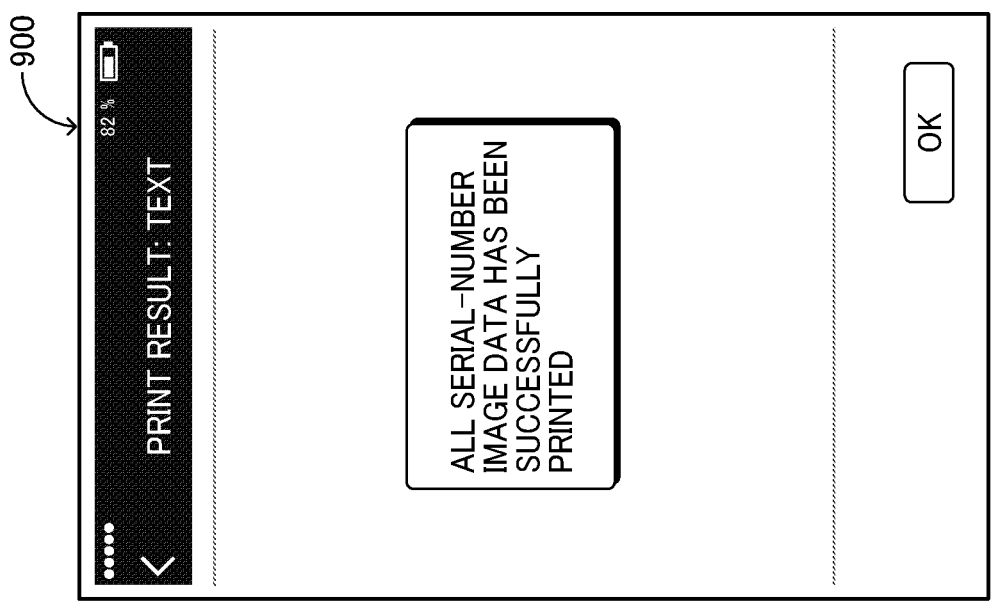

FIGS. 13A and 13B illustrate examples of print result screens displayed when "text" is selected as the print mode. FIG. 13A illustrates a print result screen 900 displayed when all pieces of serial-number image data have been successfully printed. As illustrated in FIG. 13A, the print result screen 900 displays a message indicating that the printing has been successful. On the other hand, FIG. 13B illustrates a print result screen 950 displayed when printing of some pieces of serial-number image data has failed. As illustrated in FIG. 13B, the print result screen 950 displays a "retry" button together with a list of serial-number image data for which printing has failed. In response to the display, when the user taps the "retry" button, the smartphone 60 retransmits, to the handheld printer 10, the serial-number image data for which printing has failed.

As described above, according to the present embodiment, one piece of serial-number image data is printed by one scanning operation, and another piece of serial-number image data to be printed is automatically switched each time one scanning operation is completed. Accordingly, the user does not need to be aware of the switching of the serial numbers and can print the serial numbers smoothly with less stress.

Further, according to the present embodiment, a plurality of pieces of serial-number image data is automatically generated according to the specified condition. Therefore, even when a large number of serial numbers is printed, it takes little effort to generate serial-number data.

The handheld printer 10 according to the present embodiment is expected to be used for a wide variety of applications related to serial numbers, such as printing of serial numbers on cardboards of moving luggage and printing of serial numbers on distributed materials such as test papers and meeting materials.

The first embodiment of the present disclosure has been described above. Next, a second embodiment of the present disclosure is described. In the following, descriptions of contents common to the contents of the first embodiment are omitted, and different points from the first embodiment are mainly described below.

Second Embodiment

Figure 14:
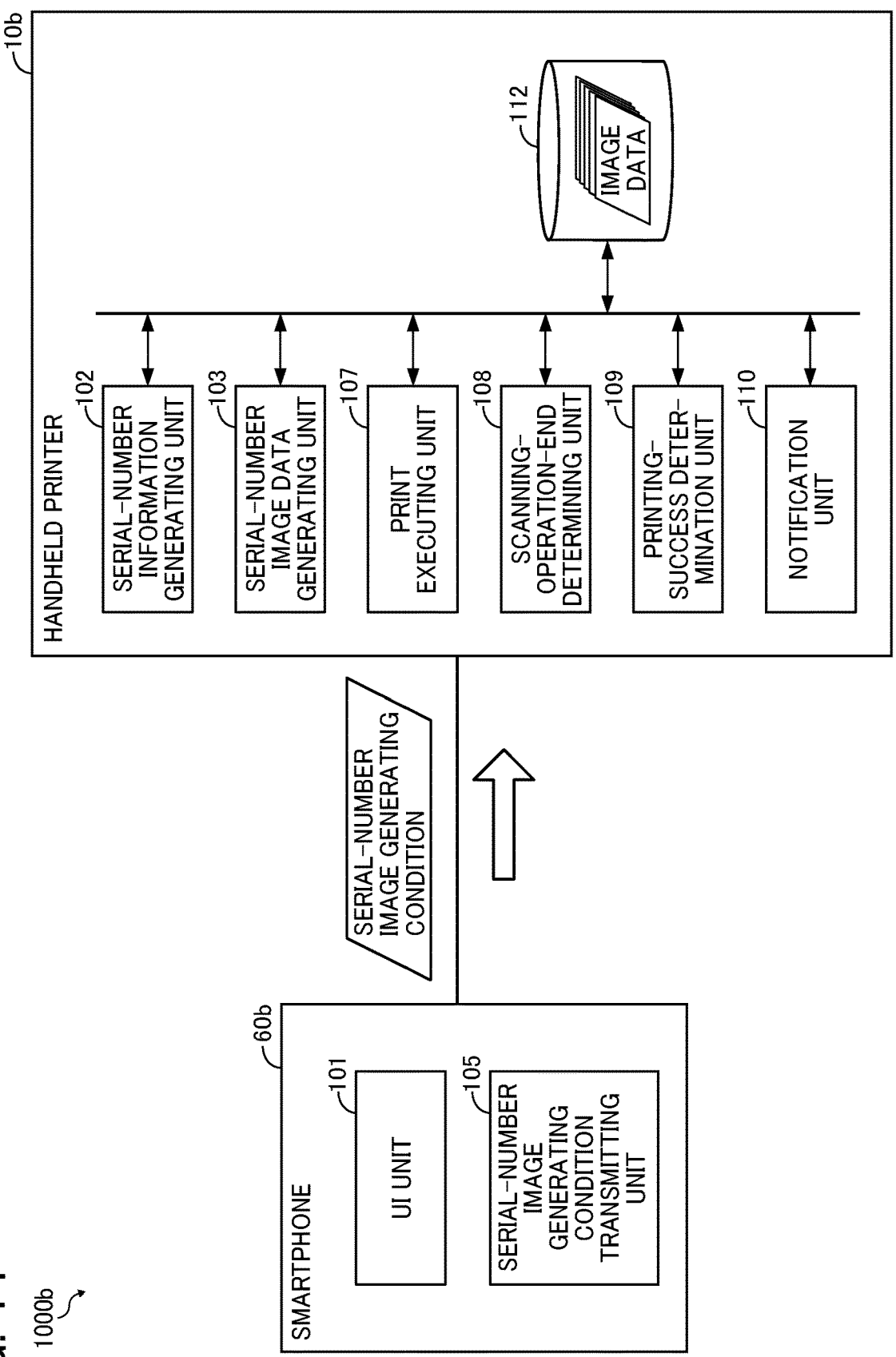
FIG. 14 is a functional block diagram of a printing system according to a second embodiment.

FIG. 14 is a functional block diagram of a printing system 1000b according to a second embodiment. Hereinafter, functional configurations of a smartphone 60b and a handheld printer 10b of the second embodiment are described with reference to FIG. 14.

The smartphone 60b includes a UI unit 101 and a serial-number image generating condition transmitting unit 105.

The UI unit 101 has the same function as the UI unit 101 included in the smartphone 60 of the first embodiment.

The serial-number image generating condition transmitting unit 105 transmits a serial-number image generating condition received by the UI unit 101 to the handheld printer 10b.

The handheld printer 10b includes a serial-number information generating unit 102, a serial-number image data generating unit 103, a print executing unit 107, a scanning-operation end determining unit 108, a printing-success determination unit 109, a notification unit 110, and a storage area 112.

Here, the serial-number information generating unit 102 and the serial-number image data generating unit 103 have functions equivalent to the functions of the smartphone 60 of the first embodiment. The print executing unit 107, the scanning-operation end determining unit 108, the printing-success determination unit 109, the notification unit 110, and the storage area 112 have functions equivalent to the functions of the handheld printer 10 according to the first embodiment.

Figure 15:
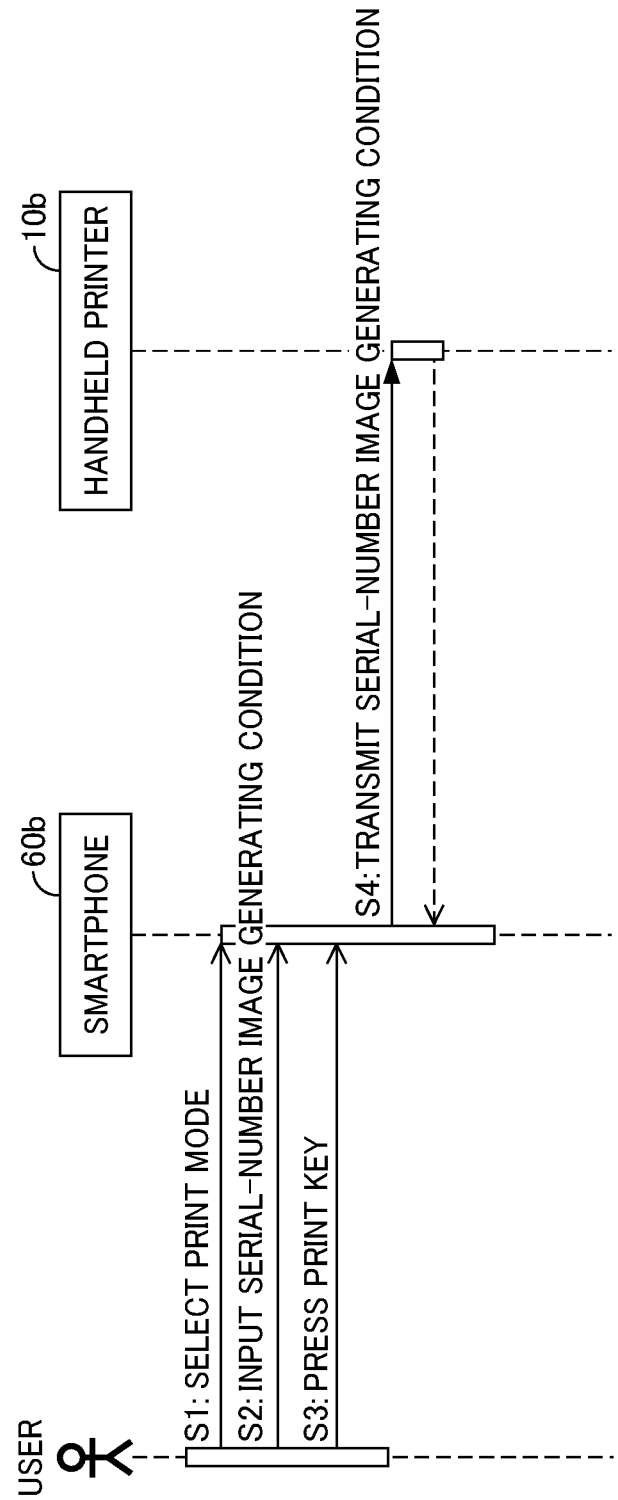
FIG. 15 is a sequence diagram of a process executed by the printing system according to the second embodiment.

Next, a series of processes performed until the preparation for printing the serial-number image data is completed is described with reference to a sequence diagram illustrated in FIG. 15.

When the user operates the smartphone 60b to start the dedicated application, the UI unit 101 displays a print mode selection screen 500 illustrated in FIG. 9. In response to the display, when the user taps either the "text" button or the "QR Code" button to select a print mode (step S1), the UI unit 101 displays the serial-number image generating condition input screen 600 or 650 illustrated in FIG. 10A, 10B, or 10C. In response to the display, the user inputs the serial-number image generating condition in the same procedure as described in the first embodiment (step S2).

After the user finishes inputting the serial-number image generating condition and taps the "OK" button on the serial-number image generating condition input screen 600 or 650 (step S3), the serial-number image generating condition transmitting unit 105 transmits the input serial-number image generating condition to the handheld printer 10b (step S4). The serial-number image generating condition transmitted in step S4 includes the selected print mode, fixed character, minimum and maximum values of serial numbers, and format of serial number. The serial-number image generating condition further includes the font, size, style, and the like of the specified text in the case where "text" is selected as the print mode and the selected error correction level in the case where "QR Code" is selected as the print mode.

Figure 16:
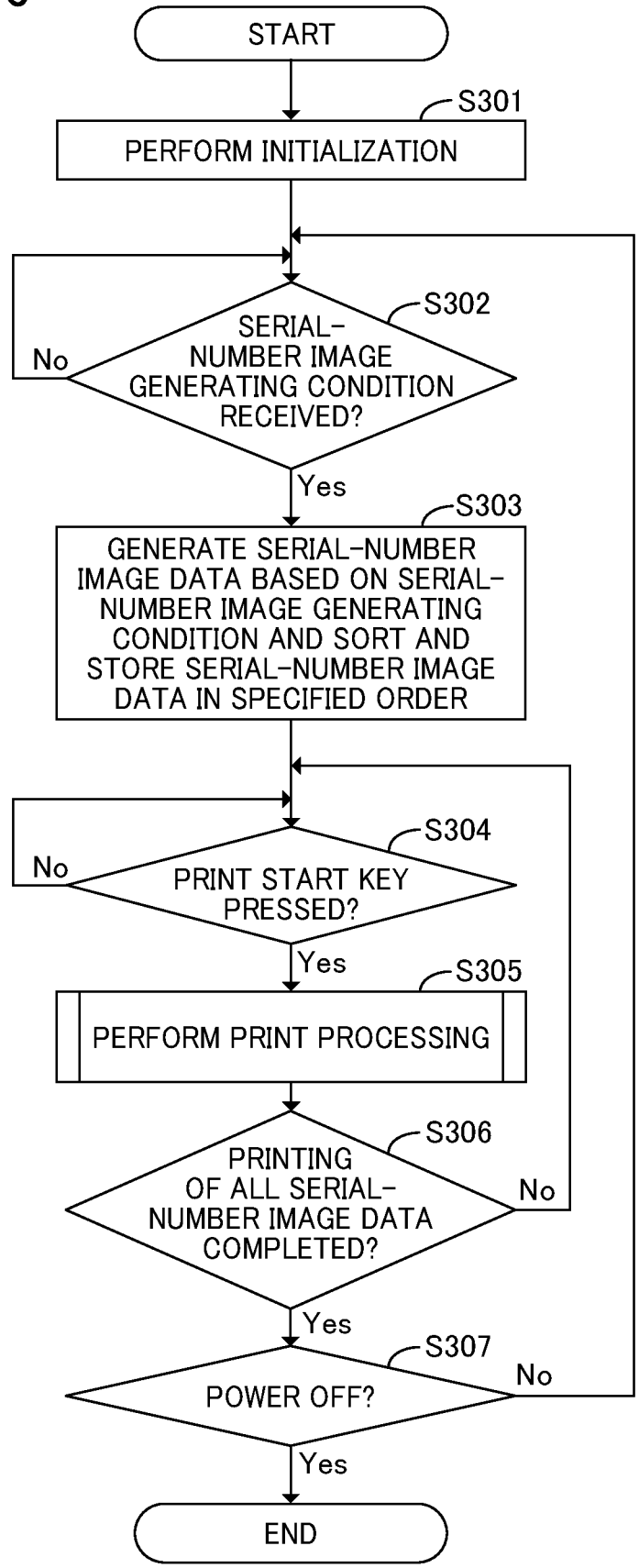
FIG. 16 is a flowchart of a process executed by the handheld printer according to the second embodiment. The accompanying drawings are intended to depict embodiments of the present disclosure and should not be interpreted to limit the scope thereof. The accompanying drawings are not to be considered as drawn to scale unless explicitly noted.

The series of processing performed until the preparation for printing the serial-number image data is completed has been described above. Next, the contents of processing executed by the handheld printer 10b are described with reference to a flowchart illustrated in FIG. 16.

When the user presses the power button 12 of the handheld printer 10b, the handheld printer 10b initializes each mounted device (step S301).

Then, the handheld printer 10b waits for the serial-number image generating condition transmitted from the smartphone 60b (No in step S302). When receiving the serial-number image generating condition (Yes in step S102), the process proceeds to step S303.

In the following step S303, the serial-number information generating unit 102 generates serial-number information in the same procedure as described in the first embodiment, based on the serial-number image generating condition received in the previous step S302. The serial-number image data generating unit 103 generates the serial-number image data in the same procedure as described in the first embodiment, based on the received serial-number image generating condition and the generated serial-number information. Then, the serial-number information generating unit 102 sorts the generated serial-number image data in an order and stores the data in the storage area 112.

Then, the processing after step S304 is executed. The contents of the processing of steps S304, S305, S306, and S307 are the same as the contents of steps S104, S105, S106, and S107 of the first embodiment described with reference to FIG. 7.

As described above, in the present embodiment, since the serial-number image data is generated on the side of the handheld printer 10b, there is an advantage that the transfer of the serial-number image data is not required and thus the load on the network is reduced.

As described above, the present disclosure has been described with several embodiments. However, embodiments of the present disclosure are not limited to the above-described embodiments, and various design changes are possible.

For example, in the above-described embodiment, when the size of the generated serial-number image data is too large to be printed by one scanning operation, the user is notified that the size is too large. In another embodiment, in such a case, the size of the generated serial-number image data may be automatically corrected to a size that can be printed by one scanning operation.

In still another embodiment, a format other than the above-described two serial number formats ("Num" and "Num/Max") may be specified, or a serial number generation rule (serial number notation, increment/decrement, etc.) may be specified by the user.

Further, in the above-described embodiment, the mode in which one piece of serial-number image data is printed by one scanning operation has been described. However, in other embodiments, one piece of serial-number image data may be printed by performing the scanning operation n times (where n is an integer of 2 or more) so that an large-size image can be printed. In such a case, the end of the scanning operation may be determined continuously n times, and the serial-number image data may be switched to the next serial-number image data in response to the end determination of n times.

The contents described above are examples of design changes, and other embodiments that can be deduced by those skilled in the art and exhibit the functions and effects of the above-described embodiments are included in the scope of the present disclosure.

Further, each function of the above-described embodiments can be described as a computer-executable program in an appropriate programming language. The program can be stored and distributed on any recording medium and can be transmitted over a network.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A handheld printing apparatus, comprising:
a memory; and
processing circuitry configured to
generate a plurality of pieces of image data;
sort the plurality of pieces of image data in an order and store the sorted plurality of pieces of image data in the memory; and
print the plurality of pieces of image data one by one in the order, wherein
the processing circuitry prints a piece of image data in response to a scan operation and identifies a next piece of image data in the order as the piece of image data to be printed in response to a next scan operation.

2. The handheld printing apparatus according to claim 1, wherein
the processing circuitry is configured to automatically generate the plurality of pieces of image data, and
the plurality of pieces of image data represents serial-number information including serial numbers.

3. The handheld printing apparatus according to claim 1, wherein
each of the plurality of pieces of image data is a text image, and
the text image represents serial-number information including a serial number.

4. The handheld printing apparatus according to claim 1, wherein each of the plurality of pieces of image data is a code pattern in which serial-number information including a serial number is encoded.

5. The handheld printing apparatus according to claim 2, wherein the processing circuitry is configured to automatically generate serial-number information including serial numbers based on a specified minimum value and a specified maximum value.

6. The handheld printing apparatus according to claim 5, wherein the processing circuitry is configured to generate the serial numbers based on a specified format.

7. The handheld printing apparatus according to claim 5, wherein the processing circuitry is configured to generate the serial numbers according to a specified rule.

8. The handheld printing apparatus according to claim 1, wherein
the processing circuitry prints the piece of image data in response to an n-th scan operation and identifies the next piece of image data in response to an n+1-th, and
n is an integer of two or more.

9. The handheld printing apparatus according to claim 1, wherein the processing circuitry is further configured to communicate with an image data providing device via a network.

10. A printing system, comprising:
a handheld printing apparatus including a memory and first processing circuitry; and
an image data providing device including second processing circuitry configured to
generate a plurality of pieces of image data;
sort the plurality of pieces of image data in an order; and
transmit the sorted plurality of pieces of image data, to the handheld printing apparatus,
the first processing circuitry is configured to
store the sorted plurality of pieces of image data in the memory, and
print the plurality of pieces of image data one by one in the order, and
the first processing circuitry prints a piece of image data in response to a scan operation and identifies a next piece of image data in the order as the piece of image data to be printed in response to a next scan operation.

11. The printing system according to claim 10, wherein the second processing circuitry of the image data providing device is configured to, in a case that the piece of image data to be printed cannot be printed by one scan operation, notify the handheld printing apparatus that the piece of image data to be printed cannot be printed by the one scan operation.

12. The printing system according to claim 10, wherein
the second processing circuitry is configured to automatically generate the plurality of pieces of image data, and
the plurality of pieces of image data represents serial-number information including serial numbers.

13. The printing system according to claim 10, wherein
each of the plurality of pieces of image data is a text image, and
the text image represents serial-number information including a serial number.

14. The printing system according to claim 10, wherein each of the plurality of pieces of image data is a code pattern in which serial-number information including a serial number is encoded.

15. The printing system according to claim 12, wherein the second processing circuitry is configured to automatically generate serial-number information including serial numbers based on a specified minimum value and a specified maximum value.

16. The printing system according to claim 15, wherein the second processing circuitry is configured to generate the serial numbers based on a specified format.

17. The printing system according to claim 15, wherein the second processing circuitry is configured to generate the serial numbers according to a specified rule.

18. The printing system according to claim 10, wherein
   the first processing circuitry prints the piece of image data in response to an n-th scan operation and identifies the next piece of image data in response to an n+1-th, and
   n is an integer of two or more.

19. A method, comprising:
   generating, by processing circuitry, a plurality of pieces of image data;
   sorting the plurality of pieces of image data in an order;
   storing the sorted plurality of pieces of image data in a memory; and
   printing the plurality of pieces of image data one by one in the order, wherein
   the printing includes printing a piece of image data in response to a scan operation and identifying a next piece of image data in the order as the piece of image data to be printed in response to a next scan operation.

20. The method according to claim 19, wherein
   the printing includes printing the piece of image data in response to an n-th scan operation and identifying the next piece of image data in response to an n+1-th, and
   n is an integer of two or more.

* * * * *